United States Patent [19]

Ohta

[11] Patent Number: 4,527,202
[45] Date of Patent: Jul. 2, 1985

[54] METHOD AND APPARATUS FOR RECORDING/REPRODUCING A CONTROL SIGNAL ON AND FROM VIDEO SIGNAL RECORDINGS BY AN ERASE HEAD

[75] Inventor: Yoshihiko Ohta, Yokohama, Japan

[73] Assignee: Victor Company of Japan, Limited, Japan

[21] Appl. No.: 323,135

[22] Filed: Nov. 19, 1981

[30] Foreign Application Priority Data

Nov. 20, 1980 [JP] Japan ................... 55-163707
Nov. 26, 1980 [JP] Japan ................... 55-166340
Dec. 4, 1980 [JP] Japan ................... 55-171359

[51] Int. Cl.$^3$ .................... G11B 5/02; G11B 5/27; H04N 5/782

[52] U.S. Cl. .................... 360/18; 360/19.1; 360/33.1; 360/66; 360/118

[58] Field of Search .................... 360/18–19.1, 360/33.1, 66, 118, 121

[56] References Cited

U.S. PATENT DOCUMENTS

| | | | |
|---|---|---|---|
| 3,060,670 | 12/1962 | Eldridge et al. | 360/66 |
| 3,278,678 | 10/1966 | Rank | 360/18 |
| 3,283,085 | 11/1966 | Lemke | 360/19.1 |
| 3,956,769 | 5/1976 | Beecroft | 360/77 |

FOREIGN PATENT DOCUMENTS

1947741  4/1971  Fed. Rep. of Germany ..... 360/19.1

*Primary Examiner*—Raymond F. Cardillo, Jr.
*Attorney, Agent, or Firm*—Lowe, King, Price & Becker

[57] ABSTRACT

In a video tape recorder having at least one rotary magnetic head for recording and reproducing a video signal on a magnetic recording tape, a control signal which will be used for controlling the rotation of the rotary head and the movement of the tape is recorded via a stationary head located at a preceding point from the rotary head. The gap of the stationary head extends in the transverse direction of the tape so as to cover the entire or nearly entire width of the tape. Thus, the control signal is recorded on the magnetic tape throughout the entire or nearly entire width thereof, preventing undesirable dropout. By supplying the stationary head with a high frequency erasing current together with the control signal, the stationary head may function not only as a control signal recording head but also as an erase head. A double-gap type head having high erasing efficiency may be used by selecting the distance between the two gaps thereof or by using two gaps having different gap lengths or spacing from each other.

16 Claims, 11 Drawing Figures

METHOD AND APPARATUS FOR RECORDING/REPRODUCING A CONTROL SIGNAL ON AND FROM VIDEO SIGNAL RECORDINGS BY AN ERASE HEAD

BACKGROUND OF THE INVENTION

This invention generally relates to a method and apparatus for recording and reproducing a control signal on and from a magnetic recording tape for use with a video tape recorder having at least one rotary head.

In a video tape recoder having at least one helical-scan type rotary magnetic head, a fixed or stationary magnetic head is provided for recording and reproducing a control signal on and from a magnetic recording tape. The control signal is recorded by the stationary magnetic head along the moving direction of the tape on one edge thereof prior to recording a video signal. The control signal recorded on the tape will be reproduced before the video signal is picked up by the rotary head or heads so that the rotation and the movement of the magnetic tape can be accurately controlled in accordance with the synchronous information derived from the control signal reproduced by the stationary magnetic head.

In most home-use VTRs using half inch width tape, the control sigal track occupies a width of 0.3 to 0.75 millimeters along its longitudinal edge so that the control signal is not superposed upon video and audio signal tracks. Therefore, the control signal is apt to be dropped out due to undesirable waving or shifting of the magnetic tape in the transverse directions. Since the control signal plays an important role for accurately positioning the rotary head on the recorded tracks on playback, dropout of the control signal will result in poor quality of the reproduced pictures.

In addition to the rotary magnetic head and the stationary magnetic head for recording and reproducing the control signal, conventional VTRs comprise an erase head and an audio head which are both stationary. The erase head is used to erase prerecorded signals prior to recording new video and audio signals and a control signal on a magnetic tape. The audio head is used to record and reproduce audio signals associated with the video signals. Namely, conventional VTRs have three fixed or stationary magnetic heads in adddition to the rotary magnetic head. These three stationary magnetic heads are located in the vicinity of the rotary head drum, and therefore, the structure around the rotary head drum is complicated.

SUMMARY OF THE INVENTION

The present invention has been developed in order to remove the above-mentioned disadvantages and drawbacks inherent to the conventional video tape recorders having a helical-scan type rotary head(s).

It is, therefore, an object of the present invention to provide a method and apparatus for recording and reproducing a control signal on and from a magnetic recording tape in a VTR, where the control signal is recorded throughout the entire or almost entire width of the magnetic tape so that the control signal is securely prevented from being dropped out, providing accurate reproducing operation of the VTR.

According to a feature of the present invention, the control signal is recorded on the magnetic recording tape by making a wide track substantially corresponding to the transverse width of the tape prior to recording the video signal by the rotary magnetic head. Since the control signal is recorded deeply in the tape, superposition of the video signal on the control signal does not result in erasure of the control signal so that the recorded control signal can be reproduced on playback.

According to another feature of the present invention, the control signal is recorded and reproduced by a fixed or stationary head which also functions as an erase head. Therefore, there is no need to provide an exclusive control signal recording/reproducing head as in the conventional VTRs, and thus, the structure around the rotary head drum can be simplified, while manufacturing cost can be reduced.

According to another feature of the present invention, a double-gap type head, which has high erasure efficiency, may be used as the stationary head functioning as both a control signal head and an erase head.

According to another feature of the present invention, the distance between the two gaps of such a double-gap type head may be selected so that signals from these two gaps are in phase when scanning prerecorded repetitive pattern of the control signal.

According to another feature of the present invention, the gap space of each of the two gaps in such a double-gap type head may be made different from each other so that accurate timing can be obtained from the output signal of the control head.

In accordance with the present invention there is provided a method of recording and reproducing a control signal on a magnetic recording tape in a video tape recorder having at least one rotary head for recording and reproducing a video signal on and from said magnetic recording tape, the method comprising the step of recording said control signal by means of a stationary head on said magnetic recording tape so that said control signal is recorded throughout the entire or nearly entire width of said magnetic recording tape, said recording step being performed prior to recording said video signal which will be superposed upon said control signal prerecorded.

In accordance with the present invention there is also provided apparatus for recording and reproducing a control signal on a magnetic recording tape in a video tape recorder having at least one rotary head for recording and reproducing a video signal on and from said magnetic recording tape, the apparatus comprising: means for generating said control signal having a predetermined repetition frequency and; a stationary magnetic head for recording said control signal fed from said first means on said magnetic recording tape and for reproducing the prerecorded control signal, said stationary magnetic tape being located so that said control signal is recorded before said video signal is recorded by said rotary head, said stationary magnetic head having at least one gap extending in the transverse direction of said magnetic tape so that said gap covers the entire or nearly entire width of said magnetic recording tape.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Prior to describing the embodiments of the present invention, conventional method and apparatus for recording a control signal on a magnetic recording tape will be described for better understanding of the present invention.

Figure 1:
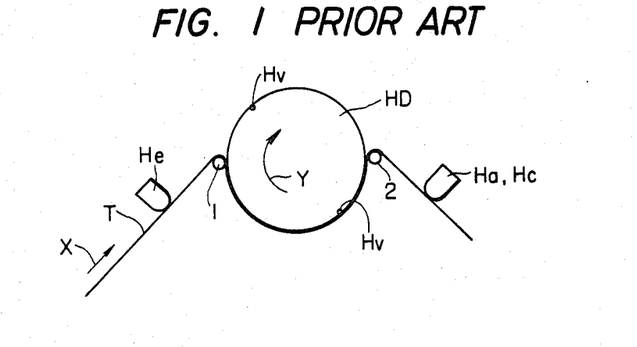
FIG. 1 is a schematic top plan view of a part of a conventional video tape recorder.

FIG. 1 is a schematic partial top plan view of a conventional video tape recorder (VTR). A magnetic recording tape T is guided by rollers 1 and 2 so that the tape T is partialy wound about a rotary head drum HD having two rotary magnetic heads Hv. The direction of the tape movement is indicated by an arrow X, while the rotating direction of the rotary head drum HD is designated at an arrow Y. The reference He is an entire-width erase head for erasing prerecorded signals on the tape T, and the reference Ha, Hc are an audio signal record/reproduce head and a control signal record/reproduce head. The erase head He is positioned so that it precedes the recording portion by the rotary heads Hv attached to the head drum HD. The entire-width erase head is supplied with a high frequency erasing current on recording mode so as to erase the prerecorded information on the magnetic tape T. The audio head is used to record and reproduce audio signals, while the control head Hc is used to record and reproduce a control signal which is necessary for accurately controlling the rotation of the head drum HD and the movement of the magnetic tape T.

Figure 2:
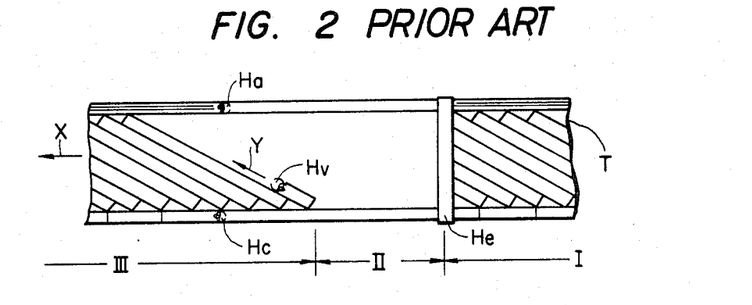
FIG. 2 is a recording track pattern on a magnetic recording tape recorded by various magnetic heads of the conventional video tape recorder of FIG. 1.

FIG. 2 shows a recording pattern on the magnetic tape T in the case that magnetic recording is effected by the VTR of FIG. 1. The recording pattern is one viewed from the magnetic substance side of the tape T, and the references Ha, Hc, He and Hv in FIG. 2 respectively correspond to the audio head Ha, control head Hc, entire width erase head He, and rotary heads Hv of FIG. 1. In FIG. 2, the region I in the magnetic tape T is a portion in which prerecorded information remains; the region II is a portion from which prerecorded information has been erased by the entire-width erase head He; and the region III is a portion that new recording has been made by the rotary heads Hv, audio head Ha and control head Hc.

In the track pattern on the magnetic tape T of FIG. 2, the control track, which is formed on the magnetic tape T by recording a control signal by the the control head Hc, has a width of 0.3 to 0.75 millimeters or so along one edge of the magnetic tape T, and this control track is independent of other tracks such as video and audio tracks. Since the control track is provided at one edge of the magnetic tape T, while the width of the control track is relatively narrow, the control signal is apt to be dropped out due to scratches on the magnetic tape T and the waving or shifting of the magnetic tape T in the transverse direction thereof. Furthermore, as described hereinbefore, an exclusive control head is required in the conventional VTR so that the narrow width control track is formed at one edge of the magnetic tape T.

Figure 3:
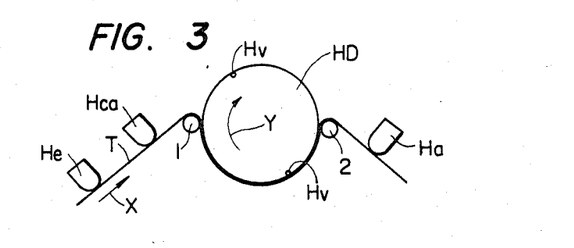
FIG. 3 is a schematic top plan view of a part of a video tape recorder, to which a first embodiment of the present invention is adapted.
Figure 5:
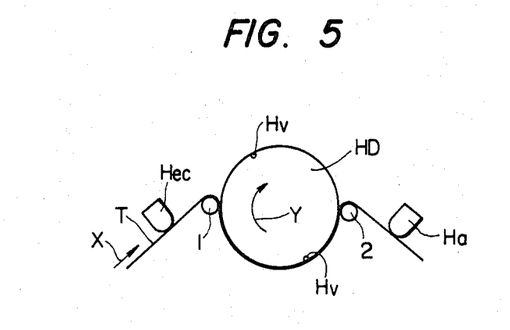
FIG. 5 is a schematic top plan view of a part of a video tape recorder, to which a second embodiment of the present invention is adapted.

FIGS. 3 and 5 respectively show first and second embodiments of the present invention. Namely, FIGS. 3 and 5 are schematic partial top plan views of VTRs used for practicing the present invention. Various elements in FIGS. 3 and 5 corresponding to those in FIG. 1 are designated at like numerals. In FIGS. 3 and 5, the reference HD is a rotary head drum; 1 and 2, rollers; T, a magnetic tape, Hv, two rotary magnetic heads attached to the rotary head drum HD; and Ha, an audio head. In FIG. 3, the reference Hca is a stationary head which is positioned at a point preceding a portion at which recording is effected by the rotary heads Hv. The stationary magnetic head Hca is a record/reproduce head for a control signal so that the control signal can be recorded throughout the entire width of the magnetic tape T from which prerecorded information has been erased by the erase head He positioned at a point preceding the position of the stationary head Hca. As is well known, a main information signal, such as a video signal, is recorded and reproduced by the rotary mangetic heads Hv performing helical scanning.

Figure 4:
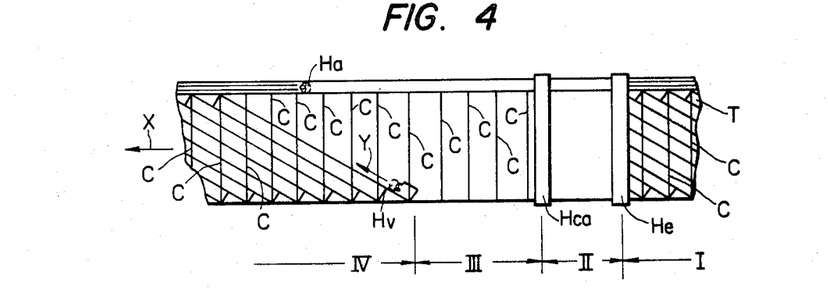
FIG. 4 is a recording track pattern on a magnetic recording tape recorded by various magnetic heads of the video tape recorder of FIG. 3.

FIG. 4 is a track pattern showing various tracks on the magnetic tape T of FIG. 3. The track pattern of FIG. 4 is one viewed from the magnetic substance side of the tape T, and the above-mentioned various heads, Ha, Hv, Hca and He are also shown for easy understanding of the track pattern. In FIG. 4, the region I is a portion that prerecoded information remains; the region II is a portion from which prerecorded information has been erased by the entire-width erase head He; the region III is a portion that only the control signal has been recorded by the stationary head Hca; and the region IV is a portion that a main information signal (for instance, a low-frequency converted chrominance signal and a frequency-converted luminance signal are combined by frequency division multiplex) is recorded upon the magnetic tape T on which the control signal has been already recorded. Namely, in the region IV, the control signal and the main video signal are overlapped or superposed upon each other.

In the second embodiment of FIG. 5, a stationary magnetic head Hec is used in place of the erase head He and the control head Hca of the first embodiment of FIG. 3. Namely, the stationary magnetic head Hec functions as both an erase head and a control head.

Figure 6:
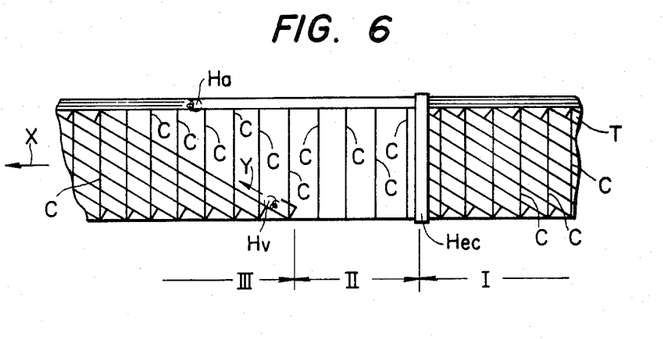
FIG. 6 is a recording trak pattern on a magnetic recording tape recorded by various magnetic heads of the video tape recorder of FIG. 5.

FIG. 6 shows a track pattern on the magnetic tape T of FIG. 5, and the track pattern of FIG. 6 differs from that of FIG. 4 in that the region II of erased portion of FIG. 4 does not exist in the track pattern of FIG. 6 because erasing and control signal recording are simultaneously effected by the stationary head Hec. Namely, the regions II and III of FIG. 6 respectively correspond to the regions III and IV of FIG. 4.

In the above embodiments of FIGS. 3 and 5, although the audio signal is arranged to be recorded via the audio head Ha, which is provided independently of the rotary magnetic heads Hv, on an exclusive sound or audio track, the audio signal may be recorded by the rotary heads Hv with the audio signal combined with the main information signal by frequency divsion multiplex or time division multiplex. If the audio signal is recorded in this way, the efficiency in utlilization of the magnetic tape T can be increased.

The high frequency signal fed to the entire-width erase head He of FIG. 3 or to the stationary head Hec of FIG. 5 for effecting erasing operation, has a frequency of 70 KHz for instance, and an amplitude so that prerecorded information on the magnetic tape T can be satisfactorily erased.

On the other hand, the control signal, which is to be fed to the stationary head Hca of FIG. 3 and to the stationary head Hec of FIG. 5, has a frequency range so that the frequency range of the control signal reproduced by the rotary magnetic heads Hv is out of the frequency range of the main information signal recorded and reproduced by the rotary magnetic heads Hv. The control signal is preferably a square wave so that accurate timing will be achieved. However, an ideal square wave occupies a considerably wide frequency range because of the presence of harmonics of the fundamental wave. If a repetition frequency of a square wave of 30 Hz with its harmonics up to the seventh is considered, the maximum frequency will be 210 Hz. This maximum frequency will increase when reproduced by the rotary magnetic heads Hv, and the increased frequency should be lower than the lower limit of the main information signal for preventing interference with the control signal. Such a control signal may be readily obtained by passing a conventional square wave signal through a low pass filter having a cutoff frequency of such as 100 to 200 Hz.

The amplitude of the control signal current is adjusted so that residual magnetism caused by the recording of the control signal does not give substantial distortion to the main information signal recorded by the the rotary magnetic heads Hv. Although it is preferable to use a square wave as the control signal, the control signal may be a sinusoidal wave or a wave similar to a sinusoidal wave. When a sinusoidal wave is used, there is no need to consider the harmonics, and therefore, the frequency of the sinusoidal wave may be simply selected so that the frequency of the control signal reproduced by the rotary magnetic heads Hv will be out of the frequency range of the main information signal.

The above-described point will be further described by taking an example. Let us assume that the moving velocity of the magnetic tape T is 33 millimeters per second and the linear velocity of the rotary magnetic heads Hv is 5.8 meters per second. In this case, the control signal prerecorded on the magnetic tape T will be reproduced by the rotary magnetic heads Hv as having a frequency of $5.8/(33\times 10^{-3})$ times the original frequency thereof. Assuming that the maximum original frequency of the control signal is 200 Hz, the control signal will be reproduced as approximately 35 KHz signal by the rotary magnetic heads Hv. This frequency is far out of the the frequency range of the main information signal reproduced via the rotary magnetic heads Hv because the lower limit of the frequency range of the main information signal is approximately 100 KHz.

The stationary head Hca of FIG. 3, receiving the above-described control signal, records the control signal as indicated by the vertical lines "c" in the region III of FIG. 4 on the portion of the magnetic tape T from which prerecorded information has been erased by the entire-width erase head He as indicated by the region II. Namely, the control signal is newly recorded throughout the entire or nearly entire width of the magnetic tape T. On the other hand, in the embodiment of FIG. 5, the stationary head Hec receiving the control signal erases prerecorded information in the region I of the magnetic tape T of FIG. 6 throughout the entire width thereof and simultaneously records the control signal as indicated by the vertical lines "c" in the region II.

In either case of FIG. 4 or FIG. 6, since the frequency of the control signal is low, the control signal is recorded not only on the surface of the magnetic substance layer of the magnetic tape T but also deeply in the magnetic substance layer.

Therefore, when recording tracks of the main information signal are formed by the rotary magnetic heads Hv on the magnetic tape T, although the control signal is partially erased at the surface of the magnetic substance layer by the erasing function of an FM wave constituting a portion of the main information signal, the control signal remains at the deep portion of the magnetic substance in such a manner that residual magnetism caused by the control signal recording is left at the deep portion. The recorded control signal, which remains in the deep portion of the magnetic substance as residual magnetism irrespective of overlapping recording of the main information signal, can therefore be satisfactorily reproduced on playback. In addition, since the control signal is recorded throughout the entire or nearly the entire width of the magnetic tape T, and since the prerecorded control signal is picked up by the stationary head Hca or Hec, dropout of the control signal is effectively prevented even if waving or undesirable shifting of the magnetic tape T in the transverse direction occurs. As a result, the prerecorded control signal can be continuously reproduced as a signal having sufficient amplitude, while the control signal reproduced by the rotary magnetic heads Hv does not interfere with the main information signal since the frequency range of the control signal reproduced by the rotary magnetic heads Hv is off the frequency range of the main information signal.

The stationary magnetic head Hec used in the second embodiment of FIG. 5 may be of single-gap type or double-gap type. However, it is preferable to use, as the stationary head Hec, a double-gap type head, which has a highly efficient erasing function inasmuch as this head Hec is to function as not only a control signal recording head but also as an erase head. In the case of using such a double-gap type head as the stationary head Hec of FIG. 5, the distance or interval between the two gaps thereof may have a particular relationship with respect to the recording wavelength of the control signal on the magnetic recording tape T in order that the prerecorded control signal will be satisfactorily reproduced by the stationary head Hec.

Figure 7:
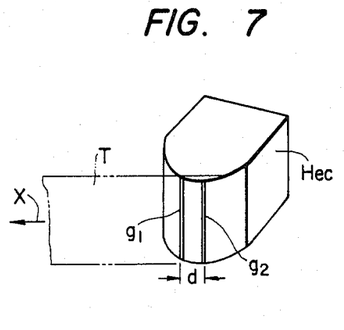
FIG. 7 is a perspective view of a stationary head which may be used in the second embodiment of FIG. 5.

This point will be described with reference to FIG. 7 which shows a perspective schematic view of the stationary head Hec which may be used in the VTR of FIG. 5. The double-gap type stationary head Hec has two parallel gaps g1 and g2 spaced by a distance "d", and the magnetic tape T is shown by way of dot-dash lines for illustrating the relationship between the stationary head Hec and the magnetic tape T. Generally speaking, in double-gap type heads, such as shown in FIG. 7, there are two sorts of the winding structures; one having the reproduced signal polarities of the gaps g1 and g2 equal to each other, and the other having their reproduced signal polarities opposite to each other.

In a stationary magnetic head Hec of the first mentioned sort, in which same polarity output signals are derived from the two gaps g1 and g2, the distance "d" between the two gaps g1 and g2 may be set so that the following relationship will be satisfied.

$$d = nV/f$$

wherein

"n" is a positive integer;
"V" is the moving velocity of the magnetic tape T;
"f" is the repetition frequency of the control signal to be recorded:

On the contrary, in a stationary magnetic head Hec of the latter sort, in which opposite polarity output signals are derived from the two gaps g1 and g2, the distance between the two gaps g1 and g2 may be set so that the following relationship will be satisfied.

$$d = (2n+1)V/2f$$

wherein

"n" is a positive integer;
"V" is the moving velocity of the magnetic tape T;
"f" is the repetition frequency of the control signal to be recorded:

When the above formulas are respectively satisfied, the magnetic fluxes at the two gaps g1 and g2 are in phase.

The double-gap stationary head Hec of FIG. 7 operates as follows. Assuming that the magnetic tape T runs in the direction of the arrow X in FIG. 7, the gap g2 first records the control signal on the magnetic tape T, and subsequently, the recorded control signal will be erased by the gap g1. At this time, the control signal is again recorded by the gap g1. Namely, a repetitive control signal pattern indicated by vertical lines "c" in FIG. 6 is formed by the gap g1 which faces the magnetic tape T after the gap g2. The recorded control signal will be reproduced on playback by the double-gap stationary head Hec as follows. The gap g2 first picks up the prerecorded control signal, and subsequently, the other gap g1 does the same. As a result, the waveform corresponding to the gap g1 can be superposed upon the waveform corresponding to the gap g2 because the gap g2 scans a subsequent peak, such as one transverse line "c" in FIG. 6, at the time that the gap g1 scans a former peak. Namely, when the distance between the two gaps is selected as in the above, the signals respectively picked up by said two gaps are in phase.

On playback, the control signal prerecorded by the gap g1 of the stationary head Hec are thus be picked up by both the two gaps g1 and g2. Therefore, a resultant output from the two gaps g1 and g2 will be obtained at the output terminal of the stationary head Hec. Although such a resultant output signal from the stationary head Hec has no problem if the distance "d" between the two parallel gaps has been selected as described in the above, in the case that the distance "d" does not satisfy one of the above-mentioned formulas, the resultant output signal will cause inaccuracy in the timing of the reproduced control signal. This is resulted from two peaks in the waveform of the resultant output signal of the stationary head Hec.

Figure 8:
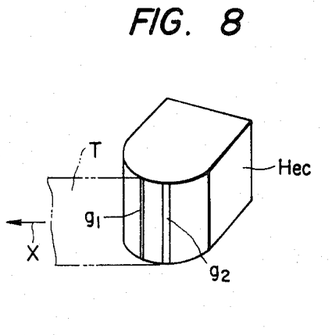
FIG. 8 is a perspective view of another stationary head which may be used in the second embodiment of FIG. 5.
Figures 9A, 9B:
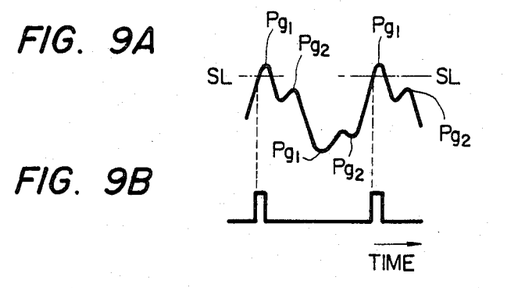
FIGS. 9A and 9B are waveform charts useful for understanding the operation of the stationary head of FIG. 8.

FIG. 8 shows a modification of the stationary head Hec of FIG. 7 so that the above-mentioned problem will be solved. The stationary head Hec of FIG. 8 has a wider gap g2' and a narrower gap g1. Namely, the two gaps are different in their gap spaces or lengths. It is assumed that these gaps g2' and g1 are spaced by a distance which does not satisfy the above formulas. When the control signal prerecorded is reproduced by the stationary magnetic head Hec of FIG. 8, the output signal of thereof will exhibit a waveform as shown in FIG. 9A. In FIG. 9A, the reference Pg1 indicates the positive and negative peaks corresponding to the narrower gaps g1, while the reference Pg2 indicates the positive and negative peaks corresponding to the wider gap g2. It will be understood that the positive peak Pg1 is greater in magnitude than the positive peak Pg2. The output signal of the stationary head Hec will be processed by a suitable comparator or a clamping circuit having a given threshold SL illustrated in FIG. 9A. As a result, the comparator or clamping circuit will produce an output pulse train signal as shown in FIG. 9B. Since the threshold is set to a value greater than the positive peak Pg2 and smaller than the positive peak Pg1, output pulses are produced in connection with only the positive peaks Pg1. Consequently, control signal information picked up by the gap g2' is removed. From the above it will be understood that both the double-gap stationary heads Hec of FIGS. 7 and 8 function as a single-gap head on playback in connection with the picking up operation of the prerecorded control signal.

Turning back to the recording operation of the control signal effected by the stationary head Hca of FIG. 3 or Hec of FIG. 5, the level or amplitude of the control signal to be recorded is preferably set as high as possible, unless magnetic saturation occurs, so that prerecorded control signal will be reproduced with a sufficient amplititude. However, if the recording signal level is too high, such control signal recorded on the magnetic tape T will cause the occurrence of distortion in some low-frequency signal components, especially low-frequency signal components, included in the main information or video signal recorded and reproduced by the rotary magnetic heads Hv. For instance, signals in the low-frequency converted chrominance signal region having a frequency of approximately 630 KHz is affected. In the presence of such distortion, undesirable difference in the color shading and noise components are apt to appear in the reproduced pictures.

Such distortion results from the interference between the control signal and the main information signal being both recorded on the same portion of the magnetic recording tape T. The repetition frequency of the interference or distortion is defined by the ratio of the relative velocity of the stationary magnetic head Hc or Hec to the relative velocity of the rotary magnetic head Hv because the control signal having a given waveform is recorded in a pattern as indicated by transverse lines "c" in FIGS. 4 and 6, so that the control signal wave is recorded as a repetition in the longitudinal or moving direction of the magnetic tape T.

Paying attention to this fact, it is possible to make the interference, which appears in the reproduced pictures, not to stand out by taking the following measure. Namely, when practicing the present invention, the ratio between the relative velocity of the stationary magnetic head Hc or Hec and the relative velocity of the rotary magnetic head Hec is so selected that the video signal is interleaved with above-mentioned repetition frequency of the interference signal in such a manner that an odd multiple of one-half the horizontal synchronous signal frequency equals the repetition frequency of the control signal reproduced by the rotary magnetic heads Hv. With this arrangement, the interference appearing in the reproduced pictures does not stand out because the phase of the interference signal reverses at every horizontal scanning line.

Suppose that the repetition frequency of the control signal is 30 Hz, and the form of video signal complies with the NTSC system standard, the above-mentioned interleaving can be achieved by selecting the relative velocity of the rotary magnetic heads Hv to be 262.5 times the relative velocity of the stationary magnetic head Hca or Hec.

Although the above-embodiments have been described in connection with a VTR having two rotary heads Hv, the present invention may be adapted to various VTRs having one, three or more rotary heads. In addition, although FIGS. 4 and 6 illustrate the video signal tracks having no guard bands between adjacent video tracks, the present invention may be adapted to both a system in which guard bands are made and a system in which guard bands are not made. Such a system of guard-bandless video tracks is disclosed in a Japanese Patent Provisional Publication No. 52-48919 (corresponding U.S. Pat. No. 4,178,606; British Pat. No. 1,506,087; German Pat. No. 2,646,806; French Provisional Publication, No. 76.31190).

In FIGS. 4 and 6, the control signal is shown to be recorded on the magnetic tape T throughout nearly the entire width of the tape T except for one edge portion on which the audio signal track is to be made. Therefore, in the embodiment of FIGS. 5 and 6, prerecorded audio signal remains unerased when the magnetic tape passes through the stationary magnetic head Hec on recording. In order to erase the prerecorded audio signal so as to enable the audio head Ha to record a new audio signal on the audio signal track, an exclusive erase head which erases only the audio track may be employed.

The method of recording audio signals is not limited to the illustrated example as mentioned hereinbefore. Namely, the audio signal may be recorded by the rotary magnetic heads Hv together with the video signal. By using such a technique of audio signal recording, the stationary magnetic audio head Ha of FIG. 4 or FIG. 6 may be removed. Namely, no stationary head is required at one side of the rotary head drum HD. This simplifies the structure of VTRs and reduces the manufacturing cost.

Figure 10:
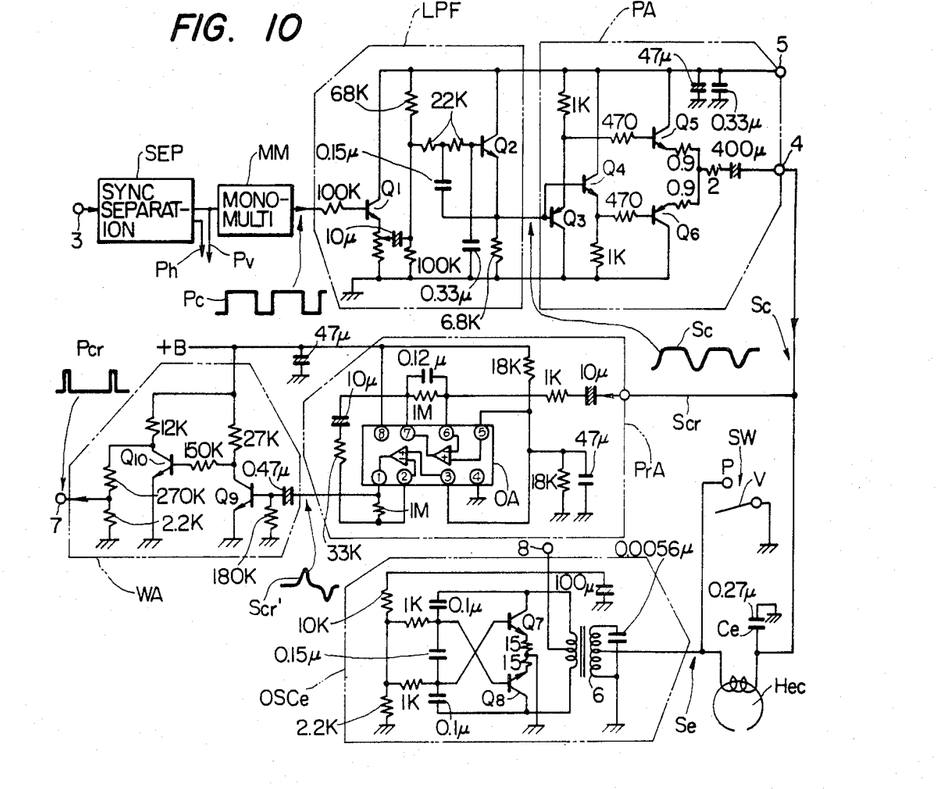
FIG. 10 is a circuit diagram of electrical circuitry used for recording and reproducing a control signal on a magnetic recording tape in the video tape recorder of FIG. 5.

Reference is now made to FIG. 10 which shows a circuit diagram of electrical circuitry used for recording and reproducing the control signal via the stationary magnetic head Hec of the second embodiment of FIG. 5. In FIG. 10, the reference numeral 3 is an input terminal for receiving a composite video signal. The composite video signal is fed to a sync separating circuit SEP in which the horizontal synchronous signal Ph and the vertical synchronous signal Pv are respectively separated from the video signal. The vertical synchronous signal Pv is fed to a monostable multivibrator MM so that the monostable multivibrator MM produces a square wave signal Pc (whose waveform is also shown) at its output.

The repetition frequency of the square wave signal Pc is 30 Hz, and this signal Pc is fed to a low pass filter LPF comprising transistors Q1 and Q2, resistors and capacitors. One example of each value of the resistors and capacitors is shown in connection with this low pass filter LPF and other circuits which will be described hereafter. The cutoff frequency ($-3$ dB) of the low pass filter LPF is 100 Hz.

The function of the low pass filter is to remove high frequency components, i.e. high order harmonics of the fundamental frequency of 30 Hz, from the square wave signal Pc. In detail, since the cutoff frequency of the low pass filter LPF is 100 Hz, harmonics of more than third order are rejected by the low pass filter LPF, resulting in a rounded square wave.

The output signal of the low pass filter LPF is designated at Sc and the waveform thereof is also shown. This output signal Sc is fed to a power amplifier PA comprising transistors Q3 to Q6, resistors and capacitors so as to be amplified. The amplified output signal of the power amplifier PA developed at an output terminal 4 is used as the control signal (also designated at Sc), and this control signal Sc is fed to a first terminal of the winding of the stationary head Hec. The power amplifier PA has a power supply terminal 5 through which electrical power is fed to the power amplifier PA only when recording is effected. With this arrangement, the control signal Sc is recorded by the stationary magnetic head Hec on the magnetic tape T on record mode.

A second terminal of the winding of the stationary magnetic head Hec is arranged to receive a high frequency current Se used for erasing operation, where the high frequency current Se is generated by an oscillator OSCe. In the illustrated example, the frequency of the erasing current Se is 70 KHz.

A capacitor Ce is connected between the first terminal of the winding of the head Hec and ground. The value of the capacitor Ce is selected so that the impedance of the capacitor Ce at the high frequency of the erasing current Se becomes substantially zero, while the impedance of the same at the frequency of the control signal Sc becomes much higher than the impedance of the stationary magnetic head Hec.

A switch SW having a movable contact V is provided for grounding the second terminal of the winding of the head Hec on playback. In detail, the switch SW has a stationary contact P connected to the above-mentioned second terminal, while the movable contact V is grounded. Since the second terminal of the winding is grounded on playback, the reproduced signal will be effectively fed to a signal processing circuit which will be described later. On recording, on the other hand, the switch SW is opened so that the erasing current Se is fed to the stationary magnetic head Hec. The switch SW may be a semiconductor switch or a relay.

On recording, the control signal Sc from the power amplifier PA flows via the stationary magnetic head Hec and a portion of the secondary winding 6 of an output transformer of the oscillator OSCe to ground, and simultaneously, the erasing current Se from the oscillator OSCe flows via the stationary magnetic head Hec and the capacitor Ce to ground. As a result, both the control signal and the erasing current flow through the winding of the stationary magnetic head Hec, superposing upon each other.

The oscillator OSCe comprises transistors Q7 and Q8, resistors and capacitors. A power supply terminal 8 is provided to the oscillator OSCe, and power applied to the terminal 8 is removed on playback. Namely, the oscillator OSCe does not generate the erasing current Se on playback.

Now the structure and operation of the circuitry of FIG. 10 will be described in connection with reproducing operation. The control signal prerecorded on the magnetic tape T (see FIGS. 5 and 6) is picked up by the stationary magnetic head Hec, thus a reproduced control signal Scr is generated across the winding of the head Hec. The reproduced control signal Scr is fed to a preamplifier PrA comprising an integrated circuit OA, which includs two differential amplifiers, resistors and capacitors.

The output signal of the preamplifier PrA, whose waveform is shown with the reference Scr', is supplied to a waveform shaping circuit WA comprising two transistors Q9 and Q10, resistors and a capacitor. The waveform shaping circuit WA includes a clamping circuit which produces a square wave output signal Pcr, whose waveform is shown, at its output terminal 7. This square wave output signal Pcr will be used as a control signal for controlling the rotation of the rotary head drum HD (see FIG. 5) and the movement of the magnetic tape T in the same manner as in the conventional VTRs.

In the case that the aforementioned double-gap type head Hec of FIG. 8 is used, the aforementioned threshold SL of FIG. 9A may be desirably set by changing the clamping voltage. As an alternative, the preamplifier PrA may be arranged not only to simply amplify its input signal Scr but also to function as a comparator with a suitable reference voltage corresponding to the threshold SL set.

From the foregoing description, it will be understood that since the control signal is recorded on the magnetic tape T throughout the entire or nearly entire width of the tape T in the present invention, the recorded control signal is readily picked up on playback, without suffering from dropout which is apt to occur in the conventional VTRs due to deviation of the magnetic tape in the transverse direction thereof from the control head. Therefore, there is no need to perform precise adjustment for the alignment of the control head with the control signal track. Furthermore, a single stationary head may function as a record/reproduce head for the control signal and simultaneously as an erase head as in the second embodiment of FIGS. 5 and 6. In this case, an exclusive control head used in the conventional VTRs is not required, and therefore, the structure around the rotay head drum HD can be simplified while manufacturing cost can be reduced. In addition, a double-gap head having high erasing efficiency may be used as the stationary head Hec of the second embodiment by selecting the interval between the two gaps thereof or by making difference in the gap length or space. Accordingly, accurate timing will be obtained from the resultant output signal of the double-gap type head Hec.

The above-described embodiments are just examples of the present invention, and therefore, it will be apparent for those skilled in the art that many modifications and variations may be made without departing from the spirit of the present invention.

What is claimed is:

1. A method of recording and reproducing a control signal on a magnetic recording tape in a video tape recorder having at least one rotary magnetic head for recording and reproducing a video signal on and from said magnetic recording tape, the method comprising the steps of:
    providing a predetermined frequency range for said control signal out of the frequency range of said video signal;
    providing said control signal to a stationary head on said magnetic recording tape;
    generating a high frequency erasing signal;
    adding said erasing signal and said control signal;
    recording said added signals by means of said stationary head over the entire or nearly entire width of said magnetic recording tape;
    thereafter recording said video signal so as to be overlapped upon said previously recorded control and erasing signals on substantially the entire width of said magnetic tape.

2. A method of recording and reproducing a control signal on a magnetic recording tape in a video tape recorder having at least one rotary magnetic head for recording and reproducing a video signal on and from said magnetic recording tape, comprising the steps of:
    (a) producing said control signal and a high-frequency erasing signal;
    (b) limiting frequency range of said control signal so as to be out of the frequency range of said video signal;
    (c) adding said erasing signal to said control signal having a limited frequency range; and
    (d) supplying said control signal, to which said erasing signal has been added, to a stationary head so that a resultant added signal is recordded by said stationary head over an entire or nearly entire width of said magnetic recording tape, while erasing previously recorded video and control signals by said stationary head prior to recording said video signal in a further overlapped relationship with the earlier recorded added control and erasing signals on said magnetic recording tape.

3. A method as claimed in claim 2, comprising the further step of obtaining said control signal to be recorded by passing a square wave signal having a given repetition frequency through a low pass filter so as to remove harmonics of higher orders of the fundamental frequency corresponding to said given repetition frequency.

4. A method as claimed in claim 2 wherein the amplitude of said control signal to be recorded is selected so as to result in the occurrence of residual magnetism having intensity such that the video signal recorded by said rotary head to be superposed upon the prerecorded control signal is free from distortion irrespective of the superposition.

5. A method as claimed in claim 2 further comprising the step of causing said stationary head to function not only as a control signal recording/reproducing head but also as an erase head, which erases at least prerecorded video and control signals.

6. Apparatus for recording and reproducing a control signal on a magnetic recording tape in a video tape recorder having at least one rotary head for recording and reproducing a video signal on and from said magnetic recording tape, the apparatus comprising:
    (a) first means for generating said control signal to have a predetermined repetition frequency in a frequency range outside of a frequency range of said video signal; and (b) a stationary magnetic head means for recording said control signal from said first means on said magnetic recording tape and for reproducing the prerecorded control signal, said stationary magnetic head means being located for recording said control signal before said video signal is recorded by said rotary head, said stationary magnetic head means having at least one gap extending in the transverse direction of said magnetic tape so that said gap covers the entire or nearly entire width of said magnetic recording tape, said stationary head means comprising means for providing high erasing efficiency when functioning as an erase head, including two parallel gaps.

7. Apparatus as claimed in claim 6, further comprising second means for generating an erasing current; and third means for superposing said erasing current upon said control signal so that a superposed signal is fed to a winding of said stationary head means for recording on said magnetic tape.

8. Apparatus as claimed in claim 6, wherein the distance between said two gaps is selected so that signals respectively picked up by said two gaps are in phase when said stationary head means scans the repetitive pattern of the prerecorded control signal.

9. Apparatus as claimed in claim 8, wherein said distance "d" between said two gaps is selected so as to satisfy the following equation when the double-gap stationary head means is of the type producing the same polarity output signals $$d = nV/f$$

wherein

"n" is a positive integer;

"V" is the moving velocity of said magnetic recording tape T;

"f" is the repetition frequency of said control signal to be recorded.

10. Apparatus as claimed in claim 8, wherein said distance "d" between said two gaps is selected so as to satisfy the following equation when the double-gap stationary head means is of the type producing opposite polarity output siglans:

$$d = (2n+1)V/2f$$

wherein

"n" is a positive integer;

"V" is the moving velocity of said magnetic recording tape T;

"f" is the repetition frequency of the control signal to be recorded.

11. Apparatus as claimed in claim 6, wherein the gap space of one gap is wider than the gap space of the other so that signals respectively picked up by the two gaps have different amplitudes.

12. Apparatus as claimed in claim 11, further comprising means for distinguishing said signals picked up by said two gaps from each other.

13. Apparatus as claimed in claim 12, wherein the distinguishing means comprises a clamping circuit responsive to the output signal of said stationary head means.

14. A method of using an erase head to record control signals on a magnetic tape together with a video signal having a known frequency range comprising the steps of:

(a) adding a high frequency erasing signal and a control signal having a frequency range outside the frequency range of said video signals;

(b) providing said added erase and control signals to said erase head; and (c) recording said added signals over substantially the entire width of the magnetic tape thereby erasing any signals previously recorded thereon.

15. A method as recited in claim 14 comprising the further step of recording said video signal on said magnetic tape having said added signals recorded thereon thereby providing video signals overlapped on said magnetic tape with said added control and erase signals.

16. Apparatus for recording and reproducing a control signal on a magnetic recording tape in a video tape recorder having at least one rotary magnetic head for recording and reproducing a video signal on and from said magnetic recording tape, the apparatus comprising:

(a) first means for generating said control signal having a predetermined repetition frequency;

(b) second means for limiting the frequency range of said control signal so as to be out of the frequency range of said video signal;

(c) third means for generating a high-frequency erasing current;

(d) a stationary head for recording said control signal together with said erasing current, said stationary head being located so that said control signal is recorded before said video signal is recorded by said rotary head, said stationary head having at least one gap extending in the transverse direction of said magnetic tape so that said gap covers the entire or nearly the entire width of said magnetic recording tape; and (e) fourth means for supplying said control signal, having a limited frequency range, and said erasing current to said stationary head so that said stationary head is driven by a resultant added signal.

* * * * *